United States Patent
Herman et al.

(10) Patent No.: US 9,781,809 B2
(45) Date of Patent: Oct. 3, 2017

(54) DYNAMIC PATHLIGHT BRIGHTNESS BASED ON SIZE AND DISTANCE OF MOTION/OBJECT APPROACHING THE DEVICE

(71) Applicant: Google Inc., Mountain View, CA (US)

(72) Inventors: Kenneth Louis Herman, San Jose, CA (US); Bryan James, Menlo Park, CA (US); Yash Modi, San Mateo, CA (US); Laura Rabb, San Jose, CA (US); Michael Lammers, Redwood City, CA (US); Aveek Ravishekhar Purohit, Mountain View, CA (US); Michael Dixon, Sunnyvale, CA (US); Shankaranand Swaminathan Iyer, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 65 days.

(21) Appl. No.: 14/683,420

(22) Filed: Apr. 10, 2015

(65) Prior Publication Data
US 2016/0302284 A1   Oct. 13, 2016

(51) Int. Cl.
 *H05B 37/02* (2006.01)
 *H05B 33/08* (2006.01)

(52) U.S. Cl.
 CPC ..... *H05B 37/0218* (2013.01); *H05B 33/0854* (2013.01); *H05B 37/0227* (2013.01); *Y02B 20/44* (2013.01)

(58) Field of Classification Search
 CPC . Y02B 20/44; H05B 37/0218; H05B 37/0227
 See application file for complete search history.

(56) References Cited

U.S. PATENT DOCUMENTS

| | | |
|---|---|---|
| 5,045,758 A | 9/1991 | Hildebrand |
| 8,143,789 B2 | 3/2012 | Ku et al. |
| 8,716,941 B2 | 5/2014 | Kim |
| 2007/0133199 A1* | 6/2007 | Lebens ............ F21L 4/027 362/157 |

(Continued)

FOREIGN PATENT DOCUMENTS

WO    WO-2013084158 A1    6/2013

OTHER PUBLICATIONS

Extended European Search Report dated Sep. 29, 2016 as received in Application No. 16164304.4.

*Primary Examiner* — Douglas W Owens
*Assistant Examiner* — Pedro C Fernandez
(74) *Attorney, Agent, or Firm* — Morris & Kamlay LLP

(57) ABSTRACT

A system and method for automatic path light control based on a detected size and classification of motion around the device using passive infrared (PIR) sensor technologies and distributed classification algorithms, and on detected light levels in and around the path area using ambient light sensor (ALS) technologies. By using such sensor data, the path light does not need to be maintained at a fixed value, which may be inadequate or inefficient at times, nor require constant user adjustments. Implementations of the disclosed subject matter enable automatic path light control that can be dynamic and automatically adjusted to fit the environment, the current user characteristics and the current user movements through the environment.

31 Claims, 4 Drawing Sheets

(56) References Cited

U.S. PATENT DOCUMENTS

| | | | |
|---|---|---|---|
| 2008/0122635 A1* | 5/2008 | Fujikawa | H05B 37/02 340/573.1 |
| 2009/0262189 A1* | 10/2009 | Marman | G08B 13/19613 348/143 |
| 2010/0164384 A1 | 7/2010 | Ku et al. | |
| 2012/0038281 A1 | 2/2012 | Verfuerth | |
| 2012/0169236 A1 | 7/2012 | Kim | |
| 2012/0229052 A1 | 9/2012 | Yang et al. | |
| 2014/0001961 A1* | 1/2014 | Anderson | H05B 37/0227 315/153 |
| 2014/0097757 A1 | 4/2014 | Maa et al. | |
| 2014/0197757 A1 | 7/2014 | Heinrich | |
| 2014/0265934 A1 | 9/2014 | Ramey | |
| 2015/0323915 A1* | 11/2015 | Warren | H04L 12/2803 700/275 |

\* cited by examiner

DYNAMIC PATHLIGHT BRIGHTNESS BASED ON SIZE AND DISTANCE OF MOTION/OBJECT APPROACHING THE DEVICE

BACKGROUND

A path light may refer to a light source that illuminates a pathway. By comparison, a room light, for example, may illuminate an entire room including a pathway. Path lights are typically utilized to illuminate a sidewalk or other path on the exterior of a home, or a particular path or hallway on the interior of the home, especially those that may not be properly illuminated by room lights. In a commercial setting, such as a movie theater, a path light may be utilized to illuminate stairways, corridors or paths to direct consumers to their seats or to an exit. A path light may include a variety of lighting sources and an ambient light sensor such that the path light illuminates only in dark conditions.

However, in some situations, the path light may be too bright for either user comfort or energy efficiency, or may be too dim to function properly. In this case, the intensity of the path light should take into consideration factors other than simply ambient light to balance user comfort, energy efficiency and proper function.

BRIEF SUMMARY

According to implementations of the disclosed subject matter, a system and method is provided for automatic path light illumination control that can be dynamic and automatically adjusted to fit the environment, the current user characteristics and the current user movements through the environment.

To do so, an implementation of the disclosed subject matter provides passive infrared (PIR) sensor technologies for the detection of user characteristics and user movements through the environment.

An implementation of the disclosed subject matter also provides a processor to calculate a classification and direction of the motion using for example, a classification algorithm, machine learning techniques and a reference dictionary of such data, based on a study of a controlled data collection correlated to known person and image features.

An implementation of the disclosed subject matter also provides a Fourier transform that can be applied to the PIR signal to generate feature vectors for the classification algorithm.

An implementation of the disclosed subject matter also provides a discrete Fourier transform (DFT) can be applied to the PIR signal to generate data for the classification algorithm.

An implementation of the disclosed subject matter also provides a wavelet transform that can be applied to the PIR signal to generate data for the classification algorithm.

An implementation of the disclosed subject matter also provides a decision tree for the classification algorithm, wherein part of the decision tree is embodied on less-capable devices (e.g., a first processor) and part of the decision tree is embodied on more-capable devices (e.g., a second processor).

An implementation of the disclosed subject matter also provides ambient light sensor (ALS) technologies for the detection of light levels in and around the path area.

According to an implementation of the disclosed subject matter, means is provided for controlling path light illumination using at least two sensors technologies, including an ambient light sensor (ALS) that can gauge the area ambient brightness and a passive infrared (PIR) sensor that can gauge an image motion in the vicinity of the path light and a signature of the image motion in a field of view. Based thereon, means for controlling path light illumination considers ambient light levels, user proximity, height of the path light and energy consumption either equally or weighted, such that path light illumination can be configured for the best user experience, power consumption and effectiveness.

According to further implementations of the disclosed subject matter, a path light is provided having at least two sensor technologies, including an ambient light sensor (ALS) that can gauge the area ambient brightness and a passive infrared (PIR) sensor that can gauge an image motion in the vicinity of the path light and a signature of the image motion in a field of view. A path light processor is provided to then consider ambient light levels, user proximity and movement, height of the path light and energy consumption either equally or weighted, such that path light illumination can be configured for the best user experience, power consumption and effectiveness.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter. No attempt is made to show structural details in more detail than may be necessary for a fundamental understanding of the disclosed subject matter and various ways in which it may be practiced.

DETAILED DESCRIPTION

Figure 1:
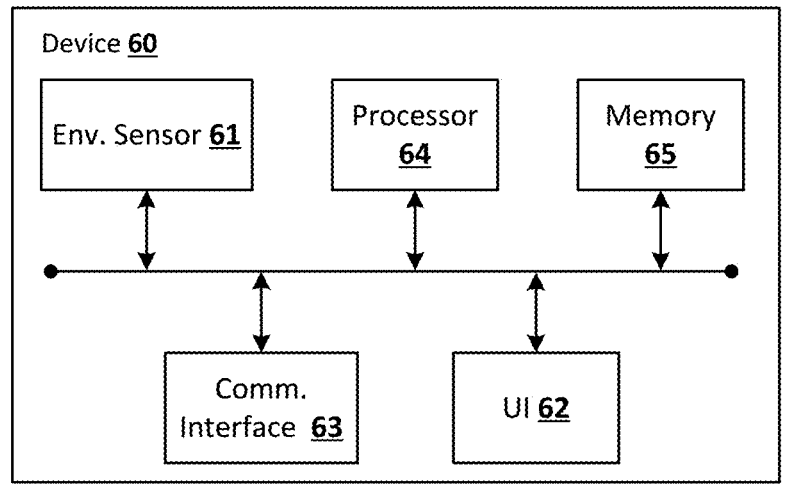
FIG. 1 shows an illustrative premises management device according to an implementation of the disclosed subject matter.

Implementations of the disclosed subject matter enable automatic path light illumination control based on a detected size and classification of motion around the device using passive infrared (PIR) sensor technologies and distributed classification algorithms, and on detected light levels in and around the path area using ambient light sensor (ALS) technologies. By using such sensor data, the path light does not need to be maintained at a fixed value, which may be inadequate or inefficient at times, nor require constant user adjustments. Implementations of the disclosed subject matter enable automatic path light illumination control that can be dynamic and automatically adjusted to fit the environment, the current user characteristics and the current user movements through the environment.

Implementations disclosed herein may use one or more sensors wherein, in general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry.

A sensor may operate with different functions at different times, such as where a motion sensor is used to control lighting in a smart home environment when an authorized user is present, and as an alert regarding unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor may also operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing or premises management device, such as where a single device includes movement, temperature, magnetic, and/or other sensors. Such a housing and components therein may be referred to collectively as a premises management device. For clarity, sensors are described with respect to the particular functions they perform and/or the particular physical hardware used when such specification is necessary for understanding.

Such sensors can be implemented as features of a control device, such as a premises management device. A premises management device may include hardware and software, in addition to the specific physical sensors that obtain information about the environment. FIG. 1 shows an example premises management device as disclosed herein. The premises management device 60 includes an environmental sensor 61, a user interface (UI) 62, a communication interface 63, a processor 64 and a computer-readable memory 65.

The environmental sensor 61 can include a passive infrared (PIR) sensor, an ambient light sensor (ALS), or any other suitable environmental sensor or combination of sensors that obtains a corresponding type of information about the environment in which the premises management device 60 is located or if provided separately, information about the environment in which the environmental sensor 61 is located.

The processor 64 is provided to receive and analyze data obtained by the sensor 61, control operation of other components of the premises management device 60 and remote components such as a path light, and process communication between the premises management device and other devices. The processor 64 executes instructions stored on the provided computer-readable memory 65, which can also store other environmental data obtained by the sensor 61. The communication interface 63, such as Wi-Fi™ or other wireless interface, Ethernet or other local network interface, or the like is provided for communication by the premises management device 60 with other devices.

The user interface (UI) 62 is provided to communicate information and/or receive inputs from a user. The UI 62 can include, for example, a speaker to output an audible alarm when an event is detected by the premises management device 60. Alternatively, or in addition, the UI 62 can include a light to be activated when an event is detected by the premises management device 60. The user interface can be relatively minimal, such as a limited-output display, or it can be a full-featured interface such as a touchscreen. Components within the premises management device 60 can transmit and receive information to and from one another via an internal bus or other mechanism as will be readily understood by one of skill in the art. One or more components can be implemented in a single physical arrangement, such as where multiple components are implemented on a single integrated circuit. Sensors as disclosed herein can include other components, and/or may not include all of the illustrative components shown.

Figure 3:
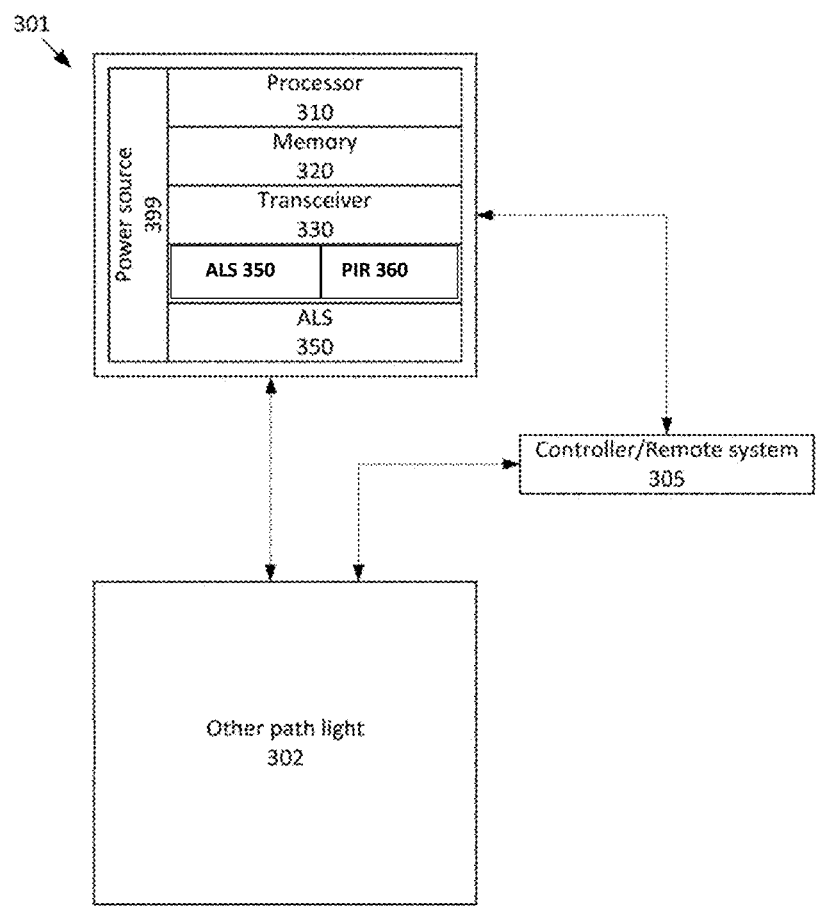
FIG. 3 shows an illustrative path light device according to an implementation of the disclosed subject matter.

In addition to other control and management features, the premises management device 60 can further control the path light or plurality of path lights as shown in FIG. 3. As noted above, a path light refers to a light source that illuminates a pathway such as a sidewalk or other particular path on the exterior of a home or business, or a stairway, corridor or other particular path on the interior of the home or business.

A path light device, as disclosed herein, may variably illuminate in response to a number of detected conditions and controls, such as the detection of motion and/or in response to the detection of a certain level of ambient light in the environment in and around the path area. One or more path lights may operate independently and/or as part of a smart home system that includes the premises management device 60. As described in greater detail below, one or more of the premises management device and path light device may include an ambient light sensor (ALS), a passive infrared (PIR) sensor, and a variable light source, but is not limited thereto. For example, where the path light device is configured to include the processor and environmental sensors, such as the passive infrared (PIR) sensor, ambient light sensor (ALS), and any other suitable environmental sensor or combination of sensors that obtains a corresponding type of information about the environment of the path light, the premises management device can be omitted.

An example of a path light device 301, as disclosed herein, is provided in FIG. 3. The path light 301 includes a processor 310, a computer-readable memory 320 such as a read-only memory, a transceiver 330 and a variable light source 340 such as an LED or LED array. The path light 301 also includes a power source such as a solar power supply, electrical connection, and/or rechargeable battery 399. In some exterior applications, for example, the power source may be wired into the device through an underground or in-ground system. Further, the power source can be provided by connections with the premises management device 60. The path light device 301 can be coupled with one or more additional path light devices 302, and a controller/Remote System 305 including, but not limited to, the premises management device 60. The path light 301 can also include an ambient light sensor (ALS) 350 and a passive infrared (PIR) sensor 360. The processor 310 performs actions based on sensor data, instructions received from the controller and/or a remote system 305, such as the premises management device 60, instructions or data stored in the memory 320, or combinations thereof.

One or more elements of the path light device 301, such as the transceiver 330 may be omitted in some configurations. As depicted in FIG. 3, the transceiver 330 can represent a radio, a USB communication channel, etc., and can connect the path light 301 to a wireless network and send/receive data via the network. The path light 301 can communicate to one or more other path light devices 302 over the network via the transceiver 330. Each of the path lights can function independently or in some degree of cooperation with one another, wherein control signals can be exchanged. For example, the path lights can coordinate their activities such that if one path light 301 detects motion and it is dark, it can signal the detected motion to other path lights 302 and all of the path lights 301, 302 in the defined area can illuminate.

The path light 301 includes the variable light source 340 such as an LED or LED array, wherein the intensity of the light source can be variably controlled by the processor 310. The processor 310 can slowly ramp the brightness of the variable light source 340 up or down so that for the user it appears as a seamless change when switching between illumination levels, in contrast to incremental changes. In doing so, the intensity of the light source 340 can cause the surrounding area to have a variable illuminance up to 550 lux, but is not limited thereto.

The path light 301 may be a component of a smart home system and may learn the appropriate intensity to illuminate the light source 340 and/or compensate for the proximity and motion of a user through the environment. For example, the ambient light sensor (ALS) 350 can detect an amount of light in the proximate environment of the path light device 301. An indication that the environment of the path light is occupied (e.g., by one or more persons) can also be received. For example, the passive infrared (PIR) sensor 360, or other motion sensor, thermal imaging sensor, camera, or the like, can detect the presence, movement, and movement direction of a person near the path light device 301 or about to enter the field of view of the path light device 301. The field of view of the path light device 301 can refer to a space that is adjacent to the path light such as, for example, a space less than 1 meter outward from an individual path light device. The field of view of the path light device 301 can be observed by the passive infrared (PIR) sensor 360 integrated into the path light device 301, and/or a signal can be received from an adjacent path light device and/or premises management device indicating the presence, movement, and movement direction of a person near the path light device 301.

The ambient light sensor (ALS) 350 and passive infrared (PIR) sensor 360 communicate data obtained by the sensor and/or an indication of movement in the environment of the path light to the processor 310, controller and/or remote system 305 and/or premises management device 60 associated with the smart home. Where required to do so, the controller and/or remote system 305 and/or premises management device 60 can also communicate data obtained by sensors 61 and/or an indication of movement in the environment to the path light device 301, 302.

As noted above, if the path light is maintained at a fixed illumination value, the path light may be inadequate or inefficient at times. The path light may be too bright for either user comfort or energy efficiency, or may be too dim to function properly, thereby requiring constant user adjustments. For example, the path light LED or light source could be too bright when the user is close to the path light, when the environment is very dark, or when the path light is at user height. However, the user may want the path light brighter when the user is far away from the path light or when the environment beyond the pathlight is very bright. Accordingly, the intensity of the path light should take into consideration other factors to balance user comfort, energy efficiency and proper function. Implementations of the disclosed subject matter can enable path light illumination control based on other factors and combination of factors, such as those detected by the passive infrared (PIR) sensor 360 and the ambient light sensor (ALS) 350. By using this sensor data and knowledge of the pathway and path light device, the path light device 301 does not need to operate at a single fixed value, but can be dynamic and change illumination levels to fit the environment, the current user characteristics and the current user movements through the environment.

In an implementation of the disclosed subject matter, path light brightness can be initially set manually or automatically and then, dynamically adjusted based on sensor data and knowledge of the pathway and path light device. This allows the path light to automatically meet different criteria without requiring user adjustments. The path light will be at the correct light level for any ambient condition and when the user is absent from the pathway, when the user is far from the pathway, when the user is near the pathway, and when the user is in movement about the pathway. An ambient light sensor (ALS) 350 and a PIR sensor 360 are shown, but are not limited thereto and other illumination, motion and proximity sensors could be used in different combinations and spatial arrangements. Further, implementations of the disclosed subject matter can be used with any system that controls and/or provides path light features, nightlights or other motion sensitive lights.

Figure 2:
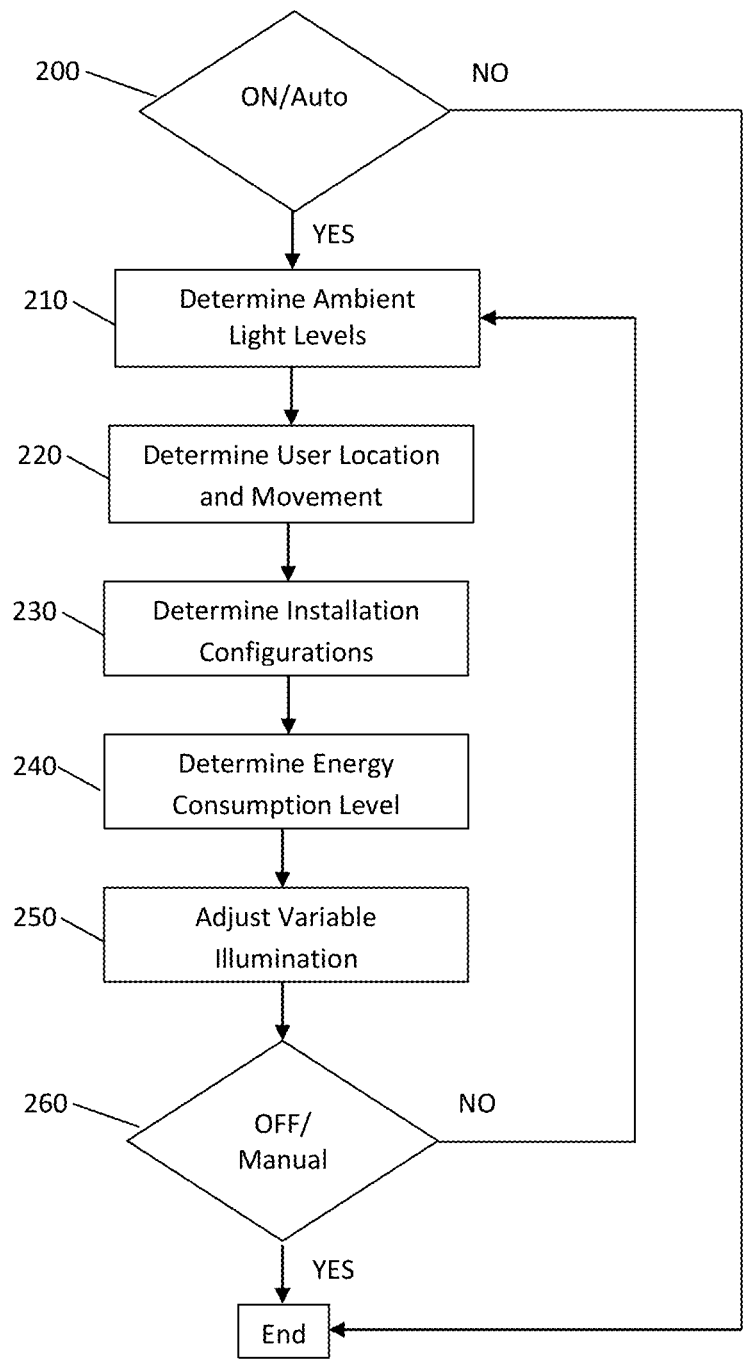
FIG. 2 is a flow chart of an illustrative process of according to an implementation of the disclosed subject matter.

In a conventional system lacking adaptable path light brightness, the system provides a less desirable user experience. The path light could be extremely bright in a small space, in otherwise high ambient light, or when a user is in close proximity. Alternatively, the light could be too dim in a big space or when a user is at a distance. In each case, the brightness of the path light may not be appropriate. A number of factors result in such discrepancies and are considered as shown in FIG. 2 in no particular order. One factor to be considered is ambient light levels. When the path light device 301 is turned on and placed in automatic mode at step 200, implementations of the disclosed subject matter determine if a pathway and surrounding environments are bright, dim or dark, and consider modulation of the path light brightness based on determined ambient light levels at step 210.

Another factor to be considered is user proximity. In a step 220, implementations of the disclosed subject matter further determine user location and movement, and consider modulation of the path light brightness based on how near or far a user is located and user movement direction, taking into account that there can be multiple users in the area.

Still another factor to be considered is a height of the path light. In a step 230, implementations of the disclosed subject matter further determine installation configurations, and consider modulation of the path light based on the height of the path light. The path light can be controlled to be brighter when the path light is close to the ground, and can be controlled to be less bright when the path light is at user height, and can be controlled to be even less bright when the path light is above user height.

However, the brighter the light, the greater the power drain. Accordingly, another factor to be considered is energy consumption. In a step 240, implementations of the disclosed subject matter further consider modulation of the path light path light brightness to target an energy consumption level necessary for the particular situation. If a user is close to the path light, there may be no reason to shine the path light very bright and use power.

By considering each of these factors, either equally or weighted, path light brightness can be configured for the best user experience, power consumption and effectiveness at step 250. The steps are repeated until the device is turned off or placed in manual mode at step 260. The consideration of such factors can be achieved through the provision of a path light device having at least two sensor technologies and a processor 310, controller 305, or premises management device 60 as shown in FIGS. 1 and 3. In the following discussion, the processor 310 is described as performing the control functions. However, any of the processor 310, controller 305, or premises management device 60, separately or in combination can provide the control functions.

In the operation of step 210, the ambient light sensor (ALS) 350 can gauge both the pathway area ambient brightness and an ambient brightness of areas beyond the pathway. The ALS 350 determines if these areas are dark, dim, or bright. If the pathway and areas beyond the pathway are both dark, the processor 310 controls the path light 340 to be dimly illuminated because it is easier to see and the pathway is sufficiently illuminated. If the pathway and areas beyond the pathway are both dim, the processor 310 controls the path light 340 to be brightly illuminated because it is easier to see and the pathway is sufficiently illuminated. However, if an area beyond the pathway is bright thereby creating a greater contrast with a dark or dim pathway, the processor 310 controls the path light 340 to be brightly illuminated such that the pathway is sufficiently illuminated. In this case, a dimly illuminated pathway may not be visible if ambient brightness of areas beyond the pathway are bright. If the pathway is bright, no path light illumination is needed.

Implementations of the disclosed subject matter use the processor 310 and the ALS 350 to dynamically adjust brightness of path light in this manner, and in further consideration of the passive infrared (PIR) sensor 360 data described below. Additional details of an ALS operation in regard to path lights is disclosed in U.S. patent application Ser. No. 14/585,225, of Yash Modi et al., entitled "Path Light Feedback Compensation", filed Dec. 30, 2014.

In an operation of step 220, the passive infrared sensor (PIR) 360 can gauge if there is motion in the vicinity of the path light by detecting an image motion and a signature of the image motion in a field of view of the PIR. The PIR 360 can detect motion in terms of signal amplitude and signal shape, and based thereon, the processor 310 can determine how far away and in what direction the motion is occurring and dynamically adjust brightness of path light.

The PIR 360 has a particular field of view and depending on where the detected object is located in the field of view, different signal patterns are generated. The disclosed subject matter can apply machine learning algorithms to learn different signal patterns, which can then be used to identify characteristics of the user in the field of view, determine where a user is located in the field of view, and determine a direction of user movement in the field of view. Based thereon, the processor 310 can adjust the brightness of the light source 340, in further consideration of the ALS 350 data described above. Additional details of PIR operation in regard to fields of view is disclosed in U.S. patent application Ser. No. 14/586,326 of Anurag Gupta et al., entitled "Lens For Pet Rejecting Passive Infrared Sensor", filed Dec. 30, 2014.

Both user position distance and movement direction within the PIR 360 field of view is inferred and used in light source 340 illumination level control. To do so, implementations of the disclosed subject matter use the shape of the signal on the PIR 360 to infer distance and direction. Using the known mechanics and cone of the PIR 360 sensor, one or more users can be detected in regions of the space, and distances from the PIR 360 determined. For example, a user can be detected 20 ft away at 30 degrees offset from center. In another example, a user can be detected 1 ft away at 5 degrees offset from center. The processor 310 looks at windows of the PIR 360 signal in real-time, such that new data is received in real time. In one case, new data can be received 10× a second and the processor 310 can consider, for example, the last 2 seconds of data. The processor 310 looks at the shape of the signal in the region and compares it to a reference dictionary of possible shapes occurring in different parts of the field of view.

The reference dictionary can be generated using, for example, training or other controlled data and can be based on a study including different people (e.g., different gender, height, weight and so forth), which pass through a field of view in particular patterns. The resulting pattern is correlated to the known person and image features. The study data is then used to identify a typical shape of the data and then, to represent that shape, features are extracted including for example, a frequency component of the signal. It can then be assumed that the device will perform and produce same or similar results in different set ups in different homes and other environments. For example, in use, image determinations can be made based on a signal frequency value (e.g., is the frequency in the 5 Hz band or is it in the 15 Hz band). Image determinations can also be made regarding the amplitude of the signal. These are a few of the examples of different image determination features that could be extracted, but are not limited thereto.

The processor 310 then computes a feature vector and calculates what that feature vector most closely matches using a classification algorithm. For example, the processor 310 can determine if the feature vector matches an image of a person 20 degrees offset at 10 ft., or matches an image of a person 30 degrees offset at 5 ft. The match can then be used to calculate probabilities of user location in the field of view, and the most probable location is then used to directly feed into the illumination control of the path light device 301. Where a user is determined to be far from the path light device 301, it may be more desirable to increase illumination of the pathlight. Where a user is determined to be near or approaching the path light device 301, it may be more desirable to decrease illumination of the pathlight. Further, where a user is passing the path light device 301, it may be more desirable to vary the illumination of the pathlight, then communicate user location information with adjacent path light devices.

In yet other implementations of the present disclosure, a Fourier transform can be applied to the PIR signal and all the bins of the Fourier transform can be used to act as feature vectors. In yet other implementations of the present disclosure, a discrete Fourier transform (DFT) can be applied to the signal to generate feature vectors for the classification algorithm. Where the output of the discrete Fourier transform is fed into the classification algorithm, a technique such as position trees or clustering can be used to determine classification as shown in FIG. 4, thereby resulting in a determination of an estimate of where a user is located in an environment.

Figure 4:
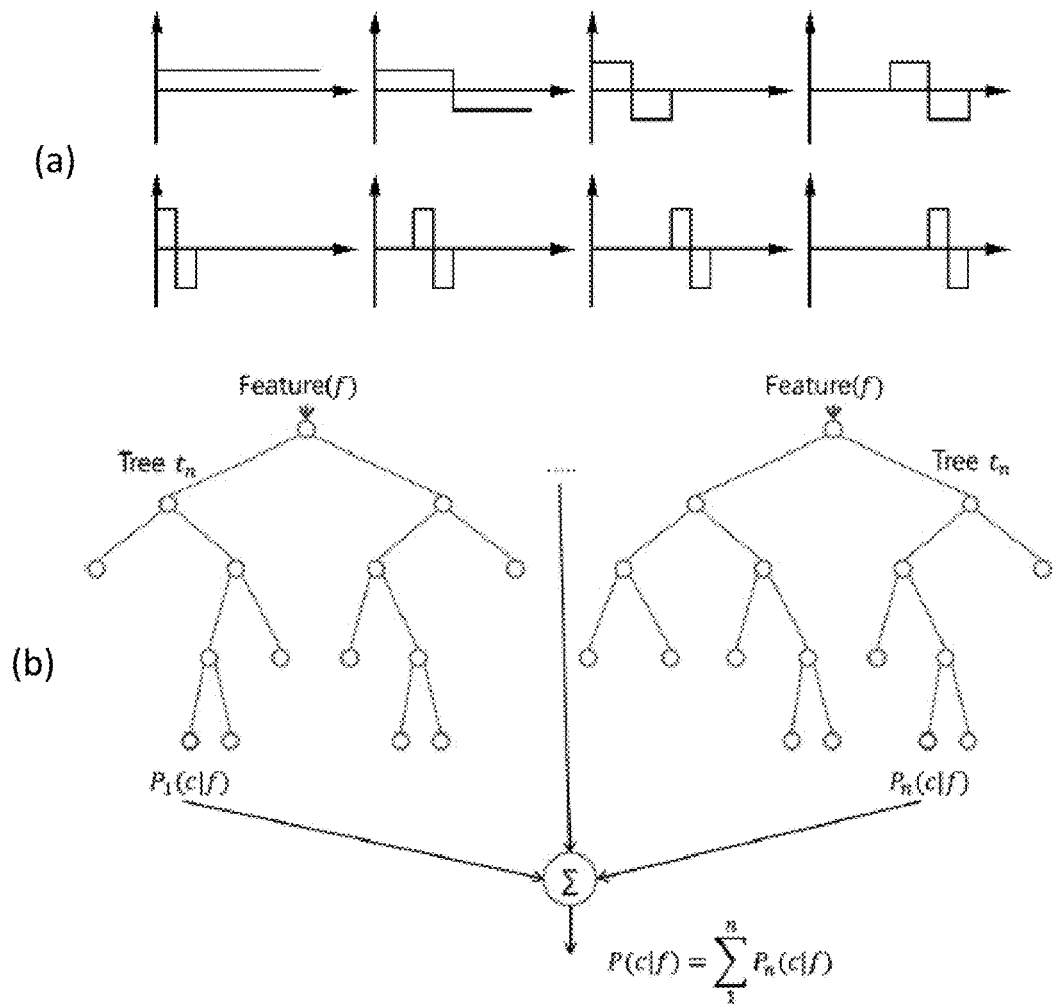
FIG. 4 shows an illustrative distributed tree classifier according to an implementation of the disclosed subject matter.

As shown in FIG. 4, implementations of the disclosed subject matter can distribute the control, classification and machine learning functions described above across a number of different devices or processors (e.g., first and second processors). For example, a decision tree for the classification algorithm can be distributed, wherein part of the decision tree is embodied on less-capable devices (i.e., a first processor having limited computing power) and part of the decision tree is embodied on more-capable devices (i.e., a second processor having greater computing power). Specifically, as shown in FIG. 4, implementations of the disclosed subject matter can apply a wavelet transform (a) and generate a feature vector, and then use a decision tree (b) wherein part of the decision tree could reside on less-capable devices such as the processor 310 and part of the decision tree could reside on more-capable devices like the cloud, network 70, or some other capable device or processor. In doing so, implementations of the disclosed subject matter distribute the classification algorithm across multiple devices depending on capability.

For example, implementations of the disclosed subject matter can take windows of data of the signal and apply a transform, such as a Fourier transform or wavelet transform that generates a feature vector. The feature vector is then applied to an algorithm, like a clustering algorithm, or a decision tree, and the decision tree is distributed or "straddled" across devices depending on their capability. In doing so, the head of the tree is on a device originating the signal, such as the processor 310, whereas leaves of the tree are further out on more capable devices like the cloud, network 70, or some other capable device, so that the implementations of the disclosed subject matter can more efficiently compute the results.

The processor 310 can also take a signature of the signal, learn features about the signal, and use those feature vectors to then plot the different zones a user can be found in and estimate where the user is in the field of view. This produces an estimated user location within the field of view, and that can directly feed into the determination of the brightness of the path light. For example, a user can take the path light home and place it in a room. The ALS 350 of the path light continuously collects data on the amount of light detected in the room, and the PIR 360 of the path light continuously collects data on the amount, distance and direction of motion data detected in the room. A baseline can be set to thereafter detect increasing and decreasing levels of ambient light and detect increasing and decreasing levels of motion.

Implementations of the present disclosure apply the ambient light and motion detection data to the path light brightness. By using existing sensors and applying machine learning techniques to predict location within the room, implementations of the present disclosure can determine the brightness of the path light, an expected brightness of the path light, and whether the expected brightness of the path light satisfies the requirements. Further, by using the same existing sensors and machine learning techniques, implementations of the present disclosure can exclude signals not related to users, such as those associated with pets. Still further, by using the same existing sensors and machine learning techniques, implementations of the present disclosure can provide pathway security features. Overall pathway security can be provided through the detection of motion on the pathway, as well as a pathway point of origin determination, such as a window exit or window entry.

In an operation of step 230, the processor 310 considers installation configurations such as the height of the path light or position against adjacent reflective walls or surfaces. This information can be input by the user at the time of installation, based on installation instructions, or detected by one or more sensors provided with the path light device 301. As noted above, the path light can be controlled to be brighter when the path light is close to the ground, and can be controlled to be less bright when the path light is at user height, and can be controlled to be even less bright when the path light is above user height.

In an operation of step 240, the processor 310 considers energy consumption levels necessary for the particular situation. If a situation occurs where low power consumption is a priority, such as power outage occurrence wherein battery life needs to be extended, the processor 310 considers such required energy consumption levels. Finally, in an operation of step 250, the processor 310 controls the light source 340 to reach the desired illumination level and the desired time. Any number of suitable driving circuits can be used depending upon application.

The implementations of the disclosed subject matter can further control path light brightness based on an elapsed time since a bright light was detected. For example, immediately after a user turns off the lights in an environment, the users' eyes have not had opportunity to adjust from the bight level to the dark level of illumination. In this detected situation, more path light brightness is needed. After some time has elapsed, the users' eyes have had opportunity to adjust from the bright level to the dark level of illumination, and less path light brightness is needed.

Accordingly, if the lights have just turned off, implementations of the disclosed subject matter illuminate the path light at increased levels, which are then ramped down to decreased levels based on the factors described above. In a similar manner, when there is any motion detected, implementations of the disclosed subject matter ramp up the brightness to illuminate the path light at increased levels and when the detected motion stops, ramp down the brightness to illuminate the path light at decreased levels based on the factors described above, wherein elapsed time to so can be manually or experimentally determined and set.

Implementations of the disclosed subject matter also provide for the path light device to become a flashlight when removed from the wall or other mounting surface. In the event of a power outage, the path light device helps light the way as described above. However, once the user leaves the field of view and/or the area of the pathlight, the user may find themselves in the dark. Accordingly, it is beneficial if the user can continue to use the path light device in some manner, such as a flashlight. By removing the path light device from the wall, the user can operate the device as a flashlight. The path light device is configured to detect such removal and operate in a flashlight mode, and can continue to use the ALS to determine if it is dark to enable the LED. The path light device can also continue to use the PIR sensor to either increase the LED brightness or keep the LED on. Accordingly, the need for additional devices such as nightlights and flashlights can be reduced or eliminated.

Implementations of the disclosed subject matter can also turn on path lights when the path light device notices home or business electrical power is out. When the power goes out, it is beneficial for the path lights to turn on and stay on. Implementations of the disclosed subject matter include battery and cellular communication to determine if the power is out locally using for example, local detection or personal area notification (PAN), or through a notification from the service. With that information, the path light device in the home that supports path lights can be told to enable path lights automatically. Further, not every path light device needs to detect that the power is out. One or more path light devices without such detection features, can simply be told by other path light devices with detection features or even told by the power company.

Many of the above features can be provided in the firmware of the device at the time of manufacture. However, other implementations of the disclosed subject matter can be provided with software updates, which can provide changes to what the feature vectors look like and provide other improvements. Installation is simple, and a walk test application can be provided to illustrate the field of view.

Path light devices as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 5:
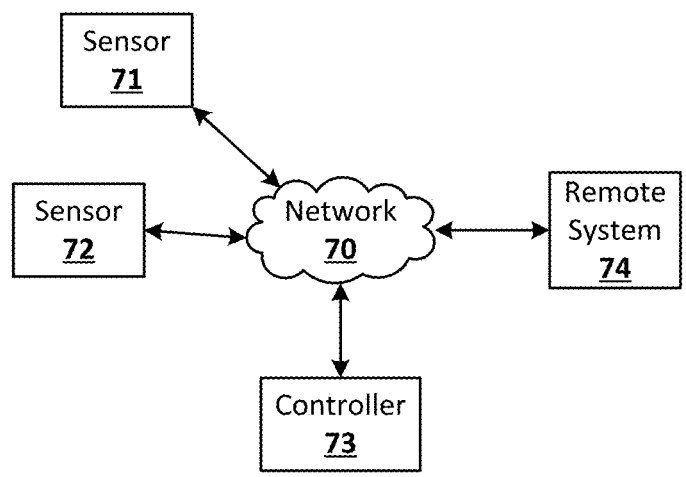
FIG. 5 shows an illustrative device network as disclosed herein, which may be implemented over any suitable wired and/or wireless communication network.

FIG. 5 shows an example of a sensor network as disclosed herein, which may be implemented over any suitable wired and/or wireless communication networks. One or more sensors 71, 72 may communicate via a local network 70, such as a Wi-Fi™ or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 5 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 5 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 5.

The smart-home environment of the sensor network shown in FIG. 5 may also include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 5. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In implementations of the disclosed subject matter, a smart-home environment may also include one or more intelligent, multi-sensing, network-connected entry detectors (e.g., "smart entry detectors"). Such detectors may be or include one or more of the sensors 71, 72 shown in FIG. 5. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some implementations of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

In implementations of the disclosed subject matter, a smart-home environment may also include one or more intelligent, multi-sensing, network-connected intruder detectors. Such detectors may be or include one or more of the sensors 71, 72 shown in FIG. 5. The illustrated intruder detectors (e.g., sensors 71, 72) may be disposed at one or more points of the smart-home environment for detecting and distinguishing an intruder. The intruder detectors may generate a corresponding signal to be provided to the controller 73 and/or the remote system 74 when an intruder is detected and distinguished. In some implementations of the disclosed subject matter, the alarm system can provide at least two modes of operation. Where no pets are expected to be present within a detection range of the sensors, the user can operate the system without the pet immune operation mode. Where pets are expected to be present within a detection range of the sensor, the user can operate the same system to implement the pet immune operation mode.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

Implementations may be implemented using hardware that may include a processor, such as a general purpose microprocessor and/or an Application Specific Integrated Circuit (ASIC) that embodies all or part of the techniques according to the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to the disclosed subject matter.

The foregoing description, for purpose of explanation, has been described with reference to specific implementations. However, the illustrative discussions above are not intended to be exhaustive or to limit the disclosed subject matter to the precise forms disclosed. Many modifications and variations are possible in view of the above teachings. The implementations were chosen and described in order to explain the principles of the disclosed subject matter and their practical applications, to thereby enable others skilled in the art to utilize those implementations as well as various implementations with various modifications as may be suited to the particular use contemplated.

The invention claimed is:

1. A path light device, comprising:
a passive infrared sensor in a smart home environment, the passive infrared sensor configured to provide a sensor signal to detect information about a user location and direction along a path in the smart home environment including a plurality of pathlights, wherein the path is one of a plurality of paths defined by the plurality of pathlights within the smart home environment;
at least one pathlight of the plurality of pathlights in the smart home environment; and
a first processor communicatively coupled to the passive infrared sensor and the at least one pathlight, the first processor configured to control the at least one pathlight to provide an illumination level, to compute a feature vector in response to the detected information about the user location and direction within the smart home environment, and to calculate, using a classification algorithm, what the feature vector most closely matches when compared to items in a reference dictionary to determine the user location and direction.

2. The path light device of claim 1, further comprising a second processor communicatively coupled to the first processor,
wherein the first processor is configured to execute a first portion of the classification algorithm and the second processor is configured to execute a second portion of the classification algorithm.

3. The path light device of claim 1, further comprising:
an ambient light sensor, the ambient light sensor configured to detect an ambient light level,
wherein the first processor is communicatively coupled to the ambient light sensor and the at least one pathlight, the first processor configured to further control the at least one pathlight to provide an illumination level in response to both the determined user location and direction, and the detected ambient light level.

4. The path light device of claim 1, wherein the first processor is configured to further control the at least one pathlight to provide an illumination level in response to an installation configuration of the at least one pathlight.

5. The path light device of claim 1, wherein the first processor is configured to further control the at least one pathlight to provide an illumination level in response to a desired energy consumption level.

6. The path light device of claim 1, wherein the first processor is configured to further control the at least one pathlight to provide an illumination level in response to an elapsed time since a bright light was detected.

7. The path light device of claim 1, wherein the first processor is configured to further control the at least one pathlight to provide an illumination level in response to a detected electrical power failure.

8. The path light device of claim 1, wherein the path light device is portable, and is configured to function as a flashlight.

9. The path light device of claim 1, wherein the reference dictionary comprises possible shapes occurring in different parts of a field of view of the passive infrared sensor.

10. The path light device of claim 2, wherein the first processor comprises a less capable processor and the second processor comprises a more capable processor, and wherein the first portion is distributed for processing by the first processor and the second portion of the classification algorithm is distributed for processing by the second processor based on a decision tree.

11. A path light device, comprising:
a sensor, the sensor in a smart home environment configured to provide a sensor signal to detect information about at least one of a user location, direction, or ambient light level along a path in the smart home environment including a plurality of pathlights, wherein the path is one of a plurality of paths defined by the plurality of pathlights within the smart home environment;
at least one pathlight of the plurality of pathlights in the smart home environment; and
a first processor communicatively coupled to the sensor and the at least one pathlight; and
a second processor communicatively coupled to the first processor, the first processor configured to control the at least one pathlight to provide an illumination level, to compute a feature vector in response to the sensor signal, and to calculate, using a classification algorithm, what the feature vector most closely matches when compared to items in a reference dictionary to determine at least one of the user location or direction, wherein the first processor is configured to execute a first portion of the classification algorithm and the second processor is configured to execute a second portion of the classification algorithm.

12. The path light device of claim 11, wherein the first processor is configured to further control the at least one pathlight to provide an illumination level in response to a detected ambient light level.

13. The path light device of claim 11, wherein the first processor is configured to further control the at least one pathlight to provide an illumination level in response to an installation configuration of the at least one pathlight.

14. The path light device of claim 11, wherein the first processor is configured to further control the at least one pathlight to provide an illumination level in response to a desired energy consumption level.

15. The path light device of claim 11, wherein the first processor is configured to further control the at least one pathlight to provide an illumination level in response to an elapsed time since a bright light was detected.

16. The path light device of claim 11, wherein the first processor is configured to further control the at least one pathlight to provide an illumination level in response to a detected electrical power failure.

17. The path light device of claim 11, wherein the path light device is portable, and is configured to function as a flashlight.

18. The path light device of claim 11, wherein the reference dictionary comprises possible shapes occurring in different parts of a field of view of the passive infrared sensor.

19. The path light device of claim 11, wherein the first processor comprises a less capable processor and the second processor comprises a more capable processor, and wherein the first portion is distributed for processing by the first processor and the second portion of the classification algorithm is distributed for processing by the second processor based on a decision tree.

20. A path light device, comprising:
a sensor in a smart home environment, the sensor configured to provide a sensor signal to detect information about at least one of a user location, direction, or ambient light level along a path in the smart home environment including a plurality of pathlights, wherein the path is one of a plurality of paths defined by the plurality of pathlights within the smart home environment;
at least one pathlight of the plurality of pathlights in the smart home environment; and
a processor communicatively coupled to the sensor and the at least one pathlight, the processor configured to control the at least one pathlight to provide an illumination level, to compute a feature vector in response to the sensor signal, and to calculate, using a classification algorithm, what the feature vector most closely matches when compared to items in a reference dictionary to determine at least one of the user location or direction.

21. The path light device of claim 20, wherein the processor is configured to further control the at least one pathlight to provide an illumination level in response to a detected ambient light level.

22. The path light device of claim 20, wherein the processor is configured to further control the at least one pathlight to provide an illumination level in response to an installation configuration of the at least one pathlight.

23. The path light device of claim 20, wherein the processor is configured to further control the at least one pathlight to provide an illumination level in response to a desired energy consumption level.

24. The path light device of claim 20, wherein the processor is configured to further control the at least one pathlight to provide an illumination level in response to an elapsed time since a bright light was detected.

25. The path light device of claim 20, wherein the processor is configured to further control the at least one pathlight to provide an illumination level in response to a detected electrical power failure.

26. The path light device of claim 20, wherein the path light device is portable, and is configured to function as a flashlight.

27. The path light device of claim 20, wherein the reference dictionary comprises possible shapes occurring in different parts of a field of view of the passive infrared sensor.

28. A method of controlling an illumination of a path light device, comprising:
- controlling an ambient light sensor along a path in a smart home environment including a plurality of pathlights, wherein the path is one of a plurality of paths defined by pathlights within the smart home environment, to measure an ambient light level adjacent to the path light device;
- controlling a passive infrared sensor configured to provide a sensor signal to detect information about a user location and direction relative to the path light device;
- controlling at least one pathlight of the plurality of pathlights in the smart home environment, to provide an illumination level, by computing a feature vector in response to the detected information about the user location and direction and the ambient light level and by calculating, using a classification algorithm, what the feature vector most closely matches when compared to items in a reference dictionary to determine the user location and direction.

29. The method of claim 28, further comprising:
- controlling a first processor communicatively coupled to the ambient light sensor, passive infrared sensor and the at least one pathlight, to execute a first portion of the classification algorithm to determine the user location and direction; and
- controlling a second processor communicatively coupled to the first processor, to execute a second portion of the classification algorithm.

30. The method of claim 28, wherein the reference dictionary comprises possible shapes occurring in different parts of a field of view of the passive infrared sensor.

31. The method of claim 29, wherein the first processor comprises a less capable processor and the second processor comprises a more capable processor, further comprising distributing the first portion of the classification algorithm for processing by the first processor and the second portion of the classification algorithm for processing by the second processor based on a decision tree.

* * * * *